United States Patent [19]
Gomiero

[11] 4,045,143
[45] Aug. 30, 1977

[54] SWIVEL HITCH STRUCTURE

[76] Inventor: Valeriano Gomiero, Via Serravalle, 19, Fossona di Cervarese (Prov. Padova), Italy

[21] Appl. No.: 609,126

[22] Filed: Aug. 29, 1975

[30] Foreign Application Priority Data

Sept. 2, 1974   Italy .................................. 41667/74

[51] Int. Cl.² ............................................. F16C 11/00
[52] U.S. Cl. .................................. 403/102; 172/457; 280/460 A; 280/461 A
[58] Field of Search .................. 403/3, 24, 53, 61, 79, 403/101, 102, 162; 280/406 A, 446 A, 456 A, 460 A, 461 A; 172/248, 272, 439, 445, 605, 449, 451, 677, 457, 450

[56] References Cited

U.S. PATENT DOCUMENTS

| | | | |
|---|---|---|---|
| 2,344,474 | 3/1944 | Tanke | 172/457 |
| 2,430,732 | 11/1947 | Orelind et al. | 172/457 |
| 2,611,304 | 9/1952 | Toland | 172/457 X |
| 2,793,880 | 5/1957 | Oehler et al. | 280/461 A |
| 2,935,147 | 5/1960 | Edman et al. | 172/457 |
| 3,056,458 | 10/1962 | Gray | 172/457 X |
| 3,107,736 | 10/1963 | Mellen | 172/457 |
| 3,321,030 | 5/1967 | Thachuk | 172/449 X |
| 3,731,750 | 5/1973 | Brazell | 172/457 |
| 3,865,404 | 2/1975 | Schwartz | 280/460 A X |
| Re. 21,989 | 12/1941 | Morkoski | 172/457 |

FOREIGN PATENT DOCUMENTS

| | | | |
|---|---|---|---|
| 170,797 | 3/1960 | Sweden | 172/457 |
| 1,053,977 | 1/1967 | United Kingdom | 280/461 A |

*Primary Examiner*—Wayne L. Shedd
*Attorney, Agent, or Firm*—Guido Modiano; Albert Josif

[57] ABSTRACT

A hitch structure for connecting in a swivelling mode implements, and particularly agricultural implements such as plows and the like, with pulling machines such as tractors. It comprises basically a guide attached to the pulling machine and, cooperating therewith, a supporting member for the end of the connecting arms of the implement. The supporting member is allowed to slide with respect to the guide in the pull force direction while concurrently rotating in a substantially horizontal plane. Locking means are provided which are effective to automatically prevent the supporting member from rotating when said implement is in its rest position.

4 Claims, 9 Drawing Figures

SWIVEL HITCH STRUCTURE

BACKGROUND OF THE INVENTION

This invention relates to a swivel hitch structure for associating implements, and particularly agricultural implements such as plows and the like, with a pulling or towing machine such as a tractor.

Plows and other agricultural implements are currently associated with pulling machines, such as tractors, by means of hitch devices which allow such implements to rotate about a horizontal axis only, i.e. the implements are not permitted to turn about a vertical axis. In other words, in the instance of a tractor pulling a plow type of implement, the plow can rotate exclusively about a horizontal axis, i.e. can be lowered for plowing and tilted up for transport, no rotational movement being provided about a vertical axis (i.e. a swinging movement from side to side in a horizontal plane) while the plow is in its lowered or working position.

This represents a first and not negligible shortcoming inasmuch as in specially severe soil conditions, particularly in rocky soils abundant with large stones, or as the tractor is turning, the plow would naturally tend, as it will be apparent, to take an offset attitude with respect to the tractor centerline; in other terms, it would tend to swing sideways and take an attitude of least pulling effort. Therefore, the very fact that the plow is forced to keep in line with the tractor, with no allowance made for it to move regularly and continuously to a position of least effort, does represent a major inconvenience, since it is a cause of energy waste as well as of poor overall performance.

There are known, as the expert in the art will surely recognize, devices for associating implements with pulling machines such as to provide a swivelling action. However, such devices are not entirely exempt from drawbacks which render their application unreliable. Furthermore, it should be noted, although the experts are already well aware of the problem, that such known devices cannot be mounted to tractors of the articulated type.

SUMMARY OF THE INVENTION

It is a primary object of this invention to provide a hitch structure whereby it becomes feasible to hitch any agricultural implements to a tractor in such a way as to ensure a swivelling action therefor.

It is another object of the invention to provide such a hitch structure, which is of straightforward construction and accordingly easy to manufacture and economically advantageous.

A further object of this invention is to provide a hitch structure which is reliable in operation, and requires no outside intervention for maintenance.

These and other objects, such as will become more apparent hereinafter, are achieved by a hitch structure for associating in a swivelling mode implements, and particularly agricultural implements such as plows and the like, with pulling machines such as tractors, comprising basically a guide attached to said pulling machine, wherewith a supporting member for the ends of the connecting arms to said implement can be associated, characterized in that said member is allowed to slide with respect to said guide in the pull direction while concurrently rotating in a substantially horizontal plane, locking means being provided which is effective to automatically prevent said member from rotating when said implement is in its rest position.

Advantageously, there is provided further locking means, manually operated, which are controllably effective to prevent any rotation of said member even if said implement is in its working position.

BRIEF DESCRIPTION OF THE DRAWINGS

Further features and advantages of the invention will become more apparent from the following detailed description of three preferred, though not exclusive, embodiments of the invention, which are illustrated by way of example and not of limitation in the accompanying drawings, wherein.

DESCRIPTION OF PREFERRED EMBODIMENTS

Figure 1:
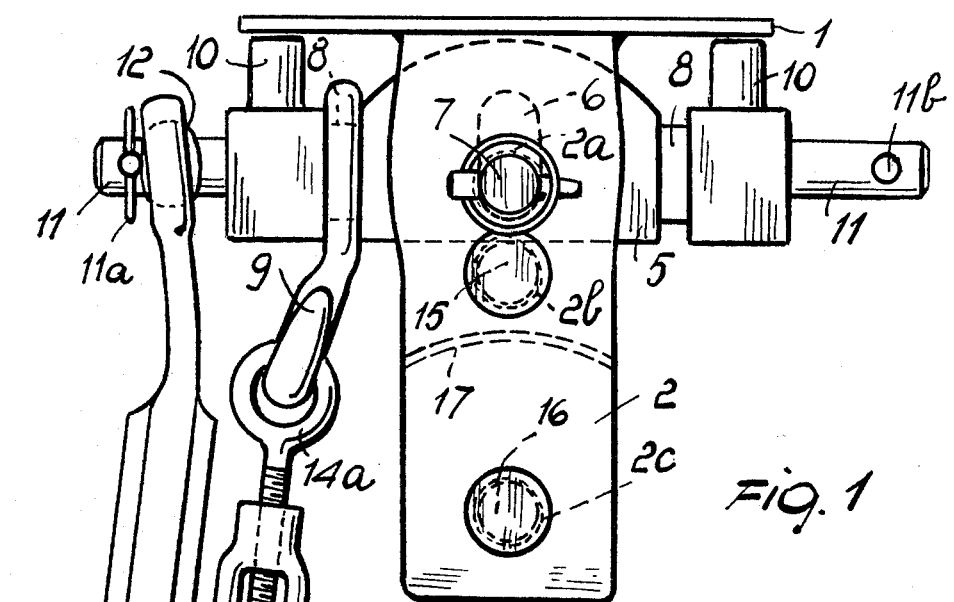
FIG. 1 is a plan view of the device according to a first embodiment of the invention.
Figure 2:
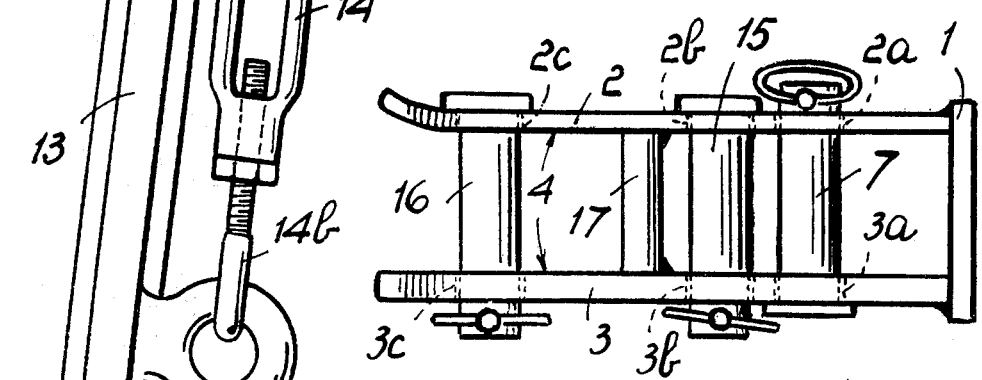
FIG. 2 is a side elevational view of a detail of the embodiment in FIG. 1, and in particular of the guide member rigidly affixed to the pulling machine.
Figure 4:
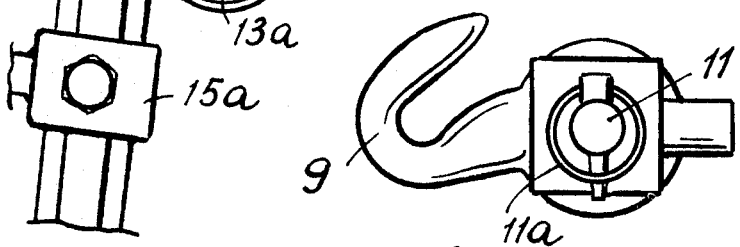
FIG. 4 is a partially sectional side view of the embodiment of FIG. 1.
Figure 3:
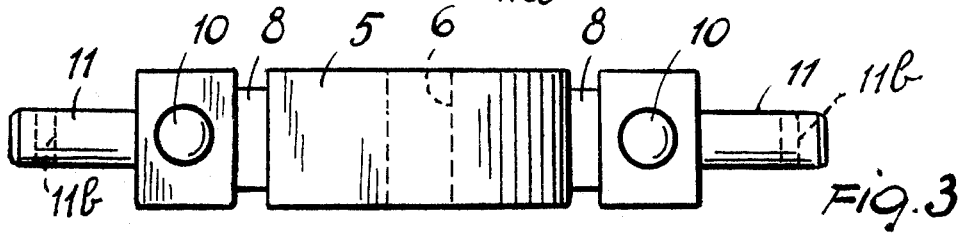
FIG. 3 is a front view of a detail of the embodiment in FIG. 1, and particularly of the supporting member for supporting the ends of said arms.

With reference more particularly to FIGS. 1, 2, 3, and 4, the first embodiment of the device according to this invention comprises first a plate member 1, which is rigidly connected to the pulling machine by means of bolts, not shown in the drawings. The plate member 1 may be a part of the frame of the pulling machine. Two metal plates, an upper and lower one, respectively 2 and 3, are welded to the plate member 1 such as to form together a guide 4 for a substantially bar-like element 5. The guide 4 and the bar-like element will be called hereinafter also draw bar member 4 and cross-bar member 5, respectively. The two metal plates, respectively 2 and 3, are each provided with three pairs of matching bores, respectively 2a and 3a, 2b and 3b, 2c and 3c. The bar-like element 5 is first provided with a through slotted hole 6 receiving a clevis pin 7 inserted through the matching bores 2a and 3a. On the bar element 5 there are further formed two toroidal grooves 8 acting as guides for the hook members 9, thereby pivotable with respect to the longitudinal axis of said substantially bar-like element 5. At its forward portion, said element 5 is provided with two substantially cylindrical projections or step means 10, which abut on the plate member 1. The points on the plate member 1 where the stop means 10 abut against the plate member 1, will be called hereinafter also "abutment means". The ends of said bar element 5 are provided with connecting pins 11, through ball joints 12, for the lever arms 13. Pins 11a, inserted through the bores 11b, prevent said ball joints 12 from withdrawing apart. The divergence of the lever arms 13 may be adjusted by means of screw members 14 which are connected by an eye 14a to the hook 9 on one side, and on the opposite side, by means of an eye 14b to another eye 13a which is welded to the lever arm 13. With 15a there is identified in the drawings, in a very schematic manner since it is well known in the art, a connection for the tilt-up device, usually a hydraulically operated device, not shown in the drawings. Furthermore, through the two matching bores 2b and 3b, there is insertable if desired a pin 15 which is effective to prevent the bar element 5 from sliding backwards. Through the matching bores 2c and 3c a towing pin 16 is also insertable, if desired. A spacer 17, intervening between the plates 2 and 3, performs the function of a stiffening member.

The operation of the device, partly made apparent by the above structural and assembling description, will now be described briefly. As the agricultural implement, hinged to the lever arms 13, is in its working position, the bar element 5, once the pin 15 has been removed, is in its fully retracted position and the pin 7 is pushed against the front inner surface of the slot 6 in the element 5. The substantially cylindrical projections 10 do not rest on the plate member 1 (but are spaced therefrom by a distance equal to the length of the slot 6 less the diameter of the pin 7) and thus the bar element 5 is free to move angularly about the pin 7. In other words, the implement is connected to the pulling machine through a system which provides for its swivelling motion with respect to the machine. As the implement is tilted up, so that the lever arms 13 rotate about the pins 11, the bar element 5 moves forwards until the projections 10, as is clearly visible in FIG. 1, abut on the plate member 1; thereby any rotation of the bar element 5 is fully prevented. In special job applications, when it is desired that the bar element 5 does not rotate, it will be enough, starting from the position of FIG. 1, that the pin 15 be inserted; the bar element 5 will not move backwards, thereby, being constrained by the projections 10 abutting the plate 1, it will not be allowed to rotate. By simply removing the pin 15, the device is brought back to its condition of swivel hitch.

Figure 5:
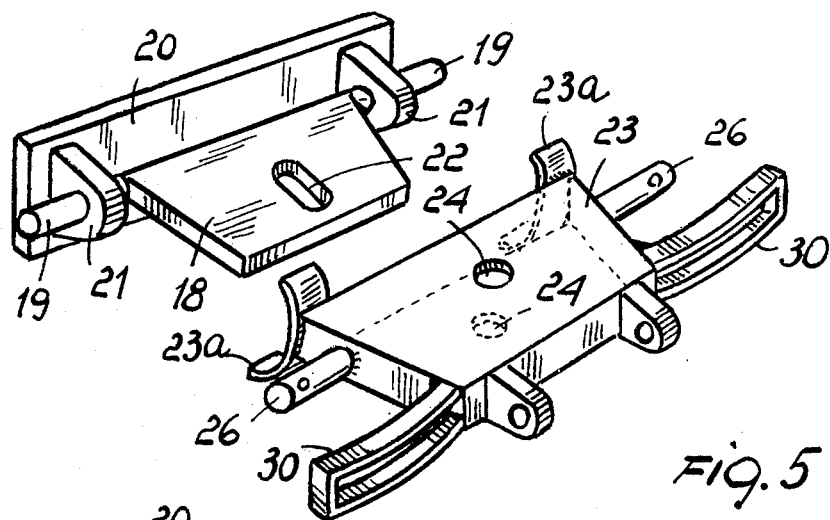
FIG. 5 is a general perspective view of a second embodiment of the invention, subdivided into the basic components thereof.
Figure 6:
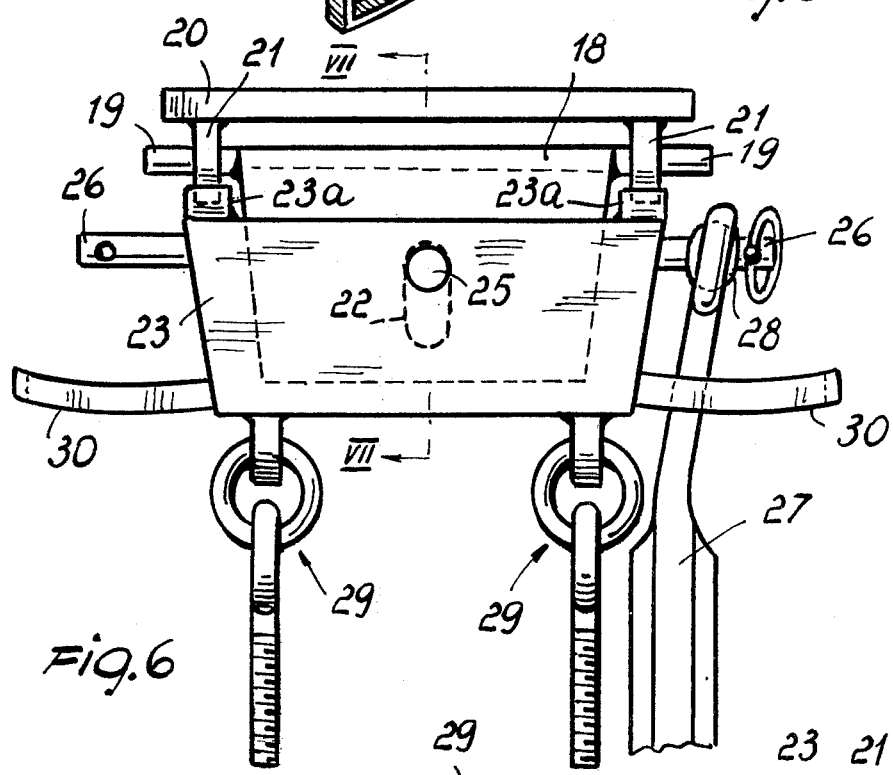
FIG. 6 is a plan view of the embodiment of FIG. 5.
Figure 7:
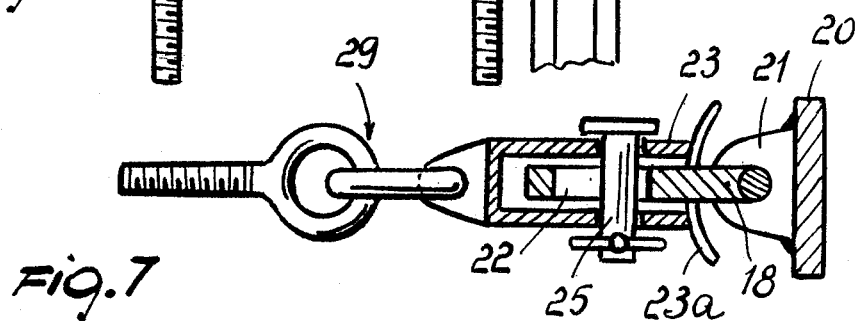
FIG. 7 is a partially sectional side view of the embodiment of FIG. 5.

FIGS. 5, 6, and 7 show a second embodiment of the invention. A plate 18, whereto a pin 19 is welded, is also connected to a plate 20 (rigidly affixed to the pulling machine) through two projections 21, which are welded to the plate 20 and provided with bores wherethrough the pin 19 is inserted. The plate 18 is free to rotate with the pin 19 in the bores of projections 21; a through slotted hole 22 being formed in the plate 18. A hollow member 23 accomodates the plate 18 therewithin. The member 23 is provided with two matching holes or bores 24 wherethrough a pin 25 is inserted which is free to slide into the slot 22. On the member 23, moreover, there are located two cylindrical surfaces 23a, suitably shaped, facing the projections 21.

Similar to the first embodiment of the invention, two pins 26 are connected to the member 23, whereabout lever arms 27 are allowed to swing which are provided with ball joints 28. The divergence angle of the arms 27 is made adjustable by acting on an adjustment means which is identical to the means used in said first embodiment and identified in FIGS. 6 and 7 with the numeral 29. The arms 27, as is clearly seen, pass inside the guide yokes 30.

The operation of this second embodiment of the invention may be described briefly as follows. In its usual working condition, the position of the member 23 with respect to the other structural components is the one shown in FIG. 6. The member 23 is allowed, therefore, to execute angular movements about the pin 25. When the lever arms 27 are lifted up, by means of a hydraulic system not shown, the plate 18 and member 23 rotate about the pin 19. The weight of the member 23 causes the latter to descend down to a point where the cylindrical surfaces 23a abut the projections 21, thus preventing the member 23 from rotating about the pin 25.

Figure 8:
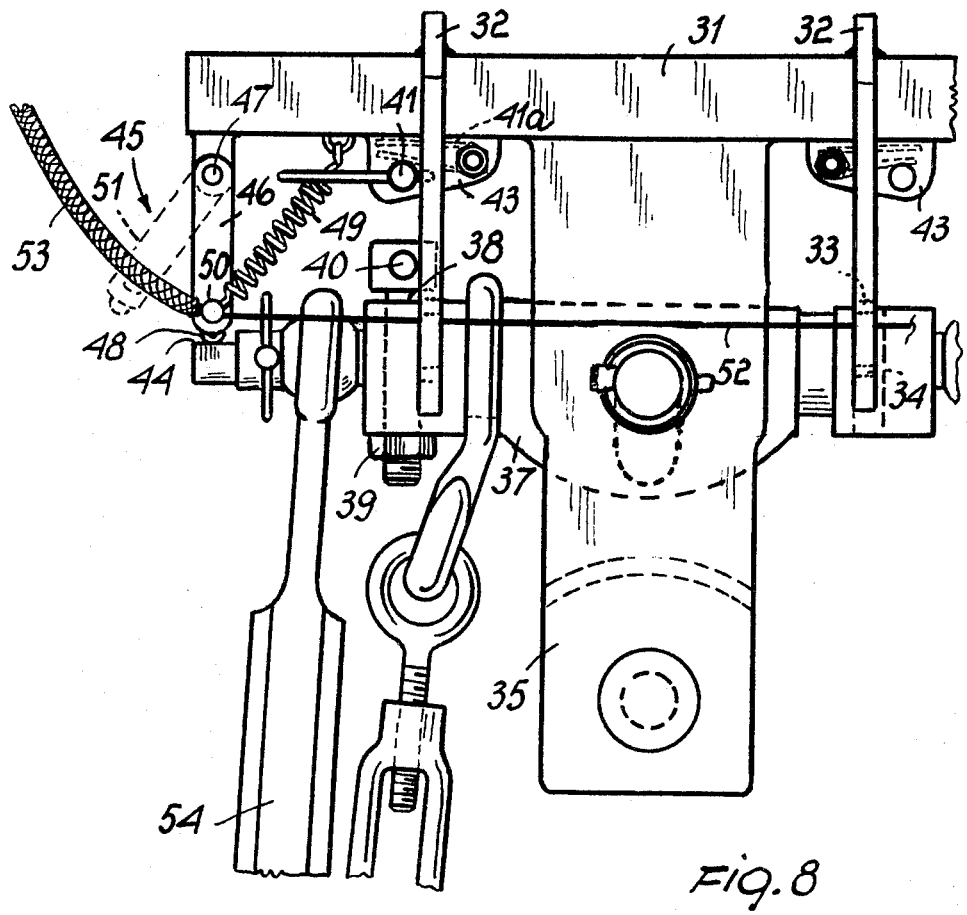
FIG. 8 is a plan view of a third embodiment of the invention featuring additional locking means having a temporary or permanent action.
Figure 9:
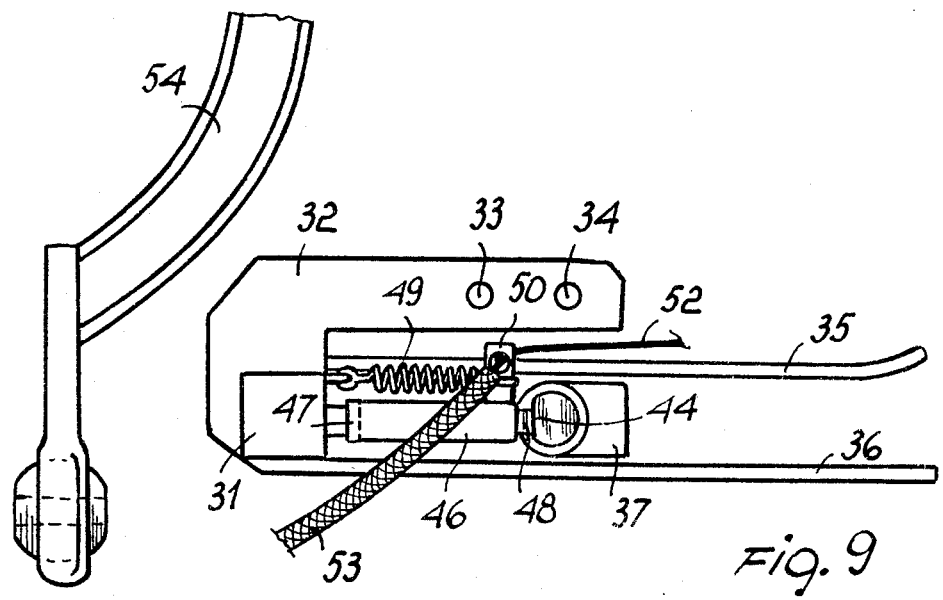
FIG. 9 is a fragmentary side view of the embodiment of FIG. 8.

With reference to FIGS. 8 and 9, there is shown in the drawings a further embodiment of the invention incorporating modifications to the constructional elements described hereinabove. First of all, the device comprises a solid box member 31, whereto two plate-like members 32 are attached perpendicularly thereto, which are rigidly connected to the pulling machine by means of pins inserted through the bores 33 or 34, according to the design of the three-point hitch being used. To this box member two plates 35 and 36 are welded which are similar to 2 and 3 in FIG. 1, said plates acting as a guide for a swing bar member 37, substantially similar to 5 in FIG. 1.

This swing bar 37 is provided with a different locking and adjustment system for its movement, which comprises a through screw 38 with locknut 39. Screw 38 has a hole 40 in the head thereof which in locking position is adapted to receive a locking pin 41 when the respective head of the screw 38 is inserted between two vertical spaced members 43 attached to the member 31. Pin 41 is retained by means of a staple spring 41a. Member pairs 43 have respective holes for the pin 41 provided with a handle for hand operation.

At the end portion, substantially cylindrical, of said swing bar a circular notch has been formed such as to provide a flat face 44 acting as a seat for a temporary locking member 45. Said member 45 comprises an arm 46 attached through a hinge connection 47 to the member 31. At the other end thereof a roller 48 is provided which contacts the flat face 44. In a rest condition, a compression spring 49, connected between the pin 50 of the roller and member 31, holds the member 46 in the position 51 shown in dotted lines.

A metal cable 52 passing over the pin 48 is attached to the pin of the symmetrical member 46, not shown. Said cable 52 is then led through a sleeve 53 up to a control member, not shown.

From said member 37 two arcuate lever arms 54 extend as shown already in FIG. 1, such as not to interfere with the machine wheels during the swinging motion.

It will be appreciated that the lever arms 54 constitute swingable abutment means for the cross-bar 37 and the cable 52 a control means for swinging the swingable abutment means from an operative into a non operative position.

The embodiment just described operates as follows. If it is desired to permanently lock the machine in its rest position, following operation of the hydraulic lift system, the swing bar member 37 is forwardly shifted so that hole 40 is positioned in register with the member 43 and the pins 41 are inserted in their seats. The whole assembly is thus rigidly locked and any undesired oscillations are effectively prevented. When on the contrary it is desired to lock the implement axially with the machine for short periods while working, i.e. when the member 37 is in its operative position shown in FIG. 8, the cable control 52 is activated, thereby the members 45 are brought to engage in the flat seats at the ends of the member 37. Any horizontal rotation of the implement with respect to the machine is thus prevented.

From the above, it will be apparent that the hitch structure according to the invention fully achieves the objects intended. It provides, in fact, for a swivelling movement of any implement with respect to the tractive machine.

This swivelling action makes the invention specially suitable, and even necessary, for articulated machines or track-type machines which, in the absence of swivel hitch systems for their implements or attachments, would remain otherwise unable to manoeuver while at work with their implements installed. This is specially advantageous in that it permits optimum performance on an agricultural job, while providing at the same time a far more efficient use of the energy available. The device according to the invention is, moreover, structurally simple and easy and economical to manufacture.

The invention as described hereinabove is susceptible of numerous variations and modifications, all of which are within the scope of the present inventive concept.

Furthermore, all the details may be replaced with other technically equivalent elements.

In practicing the invention, the materials used, as well as the dimensions, may be any ones to suit differing requirements.

I claim:

1. A hitch structure for connecting agricultural implements or the like to pulling machines, comprising, at least one draw bar member connected to a frame of a pulling machine, said draw bar member extending in a longitudinal direction of the pulling machine, a cross-bar member extending transverse to said draw bar member, a swivel connection means between said draw bar and cross-bar members allowing swivelling movement of said cross-bar member with respect to said draw bar member about an upright axis substantially perpendicular to said longitudinal direction, wherein according to the improvement said swivel connection means comprise a slotted hole in one of said draw bar and cross-bar member, said slotted hole having its longitudinal extension parallel to said longitudinal direction, a pin member inserted in said slotted hole and connected to that other one of said draw bar and cross-bar members without said slotted hole, said pin member defining said swivel axis and being shiftable within said slotted hole from a forward end position thereof to a rearward end position thereof together with said one of said draw bar and cross-bar members, abutment means cooperating with said frame of the pulling machine and facing opposite end portions of said cross-bar member, stop means on the opposite end portions of said cross-bar selectively cooperating with said abutment means in one position of said pin member with respect to said slotted hole, said stop and abutment means selectively allowing and preventing limited swivelling motion of said cross-bar about said pin member and lever and link members for connecting said cross-bar member with said agricultural implement.

2. A hitch structure according to claim 1, wherein said slotted hole is provided in said cross-bar member, said draw bar member has a through hole in register with said slotted hole and said pin member is a bolt inserted in said through hole and projecting through said slotted hole.

3. A hitch structure according to claim 1, wherein said slotted hole is provided in said draw bar member, said cross-bar member has a through hole in register with said slotted hole and said pin member is a bolt inserted in said through hole and projecting through said slotted hole and wherein said draw bar is rotatably connected to said frame about a substantially horizontal axis.

4. A hitch structure according to claim 1, wherein said abutment means are swingably connected to said frame and wherein the structure further comprises control means for swinging said abutment means from an operative position thereof in which the swivelling movement of said cross-bar is prevented into a non-operative position in which limited swivelling movement of said cross-bar is allowed.

* * * * *